US007370315B1

(12) United States Patent
Lovell et al.

(10) Patent No.: US 7,370,315 B1
(45) Date of Patent: May 6, 2008

(54) VISUAL PROGRAMMING ENVIRONMENT PROVIDING SYNCHRONIZATION BETWEEN SOURCE CODE AND GRAPHICAL COMPONENT OBJECTS

(75) Inventors: Martyn S. Lovell, Seattle, WA (US); Christopher G. Kaler, Redmond, WA (US); Peter W. Wilson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 09/717,680

(22) Filed: Nov. 21, 2000

(51) Int. Cl.
G06F 9/44 (2006.01)
G06F 9/445 (2006.01)
G06F 3/048 (2006.01)

(52) U.S. Cl. ............. 717/100; 717/104; 717/105; 717/106; 717/109; 717/110; 717/113; 715/763; 715/771

(58) Field of Classification Search ........ 717/168–178, 717/100–126; 707/1–5, 10; 345/764, 768–771, 345/856, 861; 715/762–769, 703, 771
See application file for complete search history.

(56) References Cited

U.S. PATENT DOCUMENTS

| 4,558,413 | A | * | 12/1985 | Schmidt et al. ............. 707/203 |
| 5,133,052 | A | * | 7/1992 | Bier et al. .................... 715/530 |
| 5,157,779 | A | * | 10/1992 | Washburn et al. ............. 714/37 |
| 5,187,788 | A | * | 2/1993 | Marmelstein ............... 717/109 |
| 5,485,567 | A | * | 1/1996 | Banning et al. ................ 707/4 |
| 5,760,788 | A | * | 6/1998 | Chainini et al. ............. 345/474 |
| 5,875,334 | A | * | 2/1999 | Chow et al. ................. 717/141 |
| 5,974,572 | A | * | 10/1999 | Weinberg et al. ............. 714/47 |
| 6,031,533 | A | * | 2/2000 | Peddada et al. ............. 345/733 |
| 6,032,159 | A | * | 2/2000 | Rivlin ........................ 707/204 |
| 6,122,641 | A | * | 9/2000 | Williamson et al. .... 707/103 R |
| 6,195,796 | B1 | * | 2/2001 | Porter ........................ 717/122 |
| 6,223,203 | B1 | * | 4/2001 | O'Donnell et al. ......... 709/102 |
| 6,269,475 | B1 | * | 7/2001 | Farrell et al. ................ 717/113 |
| 6,360,358 | B1 | * | 3/2002 | Elsbree et al. .............. 717/120 |
| 6,393,432 | B1 | * | 5/2002 | Flansburg et al. ........ 707/104.1 |
| 6,453,269 | B1 | * | 9/2002 | Quernemoen ................ 707/1 |
| 6,484,156 | B1 | * | 11/2002 | Gupta et al. .................... 707/1 |
| 6,757,893 | B1 | * | 6/2004 | Haikin ........................ 717/170 |
| 6,851,107 | B1 | * | 2/2005 | Coad et al. ................. 717/108 |
| 2002/0016954 | A1 | * | 2/2002 | Charisius et al. |
| 2004/0158812 | A1 | * | 8/2004 | Dye et al. ................... 717/105 |

* cited by examiner

Primary Examiner—Meng-Al T. An
Assistant Examiner—Insun Kang
(74) Attorney, Agent, or Firm—Woodcock Washburn LLP

(57) ABSTRACT

In an integrated development environment, there is a tight coupling between a design surface providing a visual representation of the various physical and logical entities in a software model and the underlying code structures that support the entities. The model can include varying combinations of a component model, a high level design whiteboard, or a physical model. Every object defined within the design surface is capable of being mapped directly to an underlying code structure. The model is a graphical representation of the actual code, thus providing two way updating, i.e., the model is updated when the programmer changes the code and vice versa.

24 Claims, 15 Drawing Sheets

VISUAL PROGRAMMING ENVIRONMENT PROVIDING SYNCHRONIZATION BETWEEN SOURCE CODE AND GRAPHICAL COMPONENT OBJECTS

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2000, Microsoft, Inc.

FIELD

The present invention pertains generally to computer-implemented software development system, and more particularly to software development system having a synchronized source code editor and visual modeling tool.

BACKGROUND

In medium to large software projects, visual modeling is often critical to successful development. Visual modeling tools allow programmers to construct a picture of the various components of a software application and allow the programmers to see how the various components interface and interact. Traditionally, these modeling tools only have been used during the "analysis" and "design" activities at the beginning of the development process. Conventional modeling tools operated under the premise that an analysis and design model would be created first, and then code would be generated (manually or automatically) from the model. In theory, any subsequent changes or enhancements should be accomplished by changing the model, and then generating new/revised code. In practice, this approach was unworkable because many of changes are made at the code level during all phases of the development process including the testing, debugging, and maintenance phases.

With conventional modeling tools, when the code diverges from the initial design a large amount of work is required to keep the model and the underlying code in agreement. In a few cases, however, modified code can be processed by the modeling tool in order to update the model. Although useful, this approach suffers from the fact that the model and the code are two separate elements that are processed to generate one from the other rather than being two views of the same information. In addition, because the model and the code are separate entities, models are often developed that are very difficult, if not impossible, to implement. Another deficiency is that semantic information is lost during the process.

Recently, visual programming has received a great amount of attention, mainly because of its promise to make programming easier, thus allowing not only computer experts but also novices to implement software to solve problems with the computer. The goal of visual programming is to aid the development of complex software applications and increase productivity by allowing the programmer to abstract the software to a visual level. The programmer could theoretically develop and manipulate a software module of interest graphically, thereby replacing the need to code complex programming statements with the ability to directly manipulate a graphical object or objects representing the software module.

Conventional visual programming environments, however, failed to meet this lofty goal and typically consist of browsers for manipulating text, an editor to create graphical user interfaces (GUI's) and a rudimentary application skeleton generator. Conventional visual programming environments do not truly allow for software visualization and do not provide a true visual programming environment. Furthermore, as the programmer transitions from the graphical design to the actual programming, they typically lose structural information and semantic information.

Therefore, there is a need in the art for a visual development environment that offers both a method for visualizing an application and graphically constructing an application. There is a need for an environment that is a two-way development process, i.e., changes made graphically are instantly made textually and vice versa.

SUMMARY

The invention is directed to an integrated development environment wherein there is a tight coupling between a design surface providing a visual representation of the various physical and logical entities in a software model and the underlying code structures that support the entities. The model can include varying combinations of a component model, a high level design whiteboard, or a physical model. Every object defined within the design surface is capable of being mapped directly to an underlying code structure. The mapping is under the control of the user, that is, the user can determine when and which entities to map to code, thereby providing an environment in which an application can be "whiteboarded", and code can be generated as the design stabilizes.

The model is a graphical representation of the actual code. This allows two way updating, i.e., the model is updated when the programmer changes the code and vice versa. In addition, code changes propagate across objects of the graphical modeling tool. As the programmer develops the underlying code, each object within the model is bound to the code. The development environment includes a graphical debugger that integrates runtime information from the underlying code such that the programmer can easily test, modify and verify the software model.

The development environment also supports graphical class construction and interface configuration. The programmer is able to graphically explore class lineage as well as view class aggregation. The underlying code structures are compiled in the background by the appropriate application. The development environment provides the programmer with the ability to graphically group the objects of the software model and define many levels of varying abstraction. Other features include the automatic creation of ToDo items as they, or someone else, makes the changes to the model.

In one embodiment, the development environment allows the programmer to graphically group (package) objects and create a build manifest for deployment. In another embodiment, the development environment includes source templates and intelligent designers (agents) for producing source code.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

Hardware and Operating Environment

Figure 1:
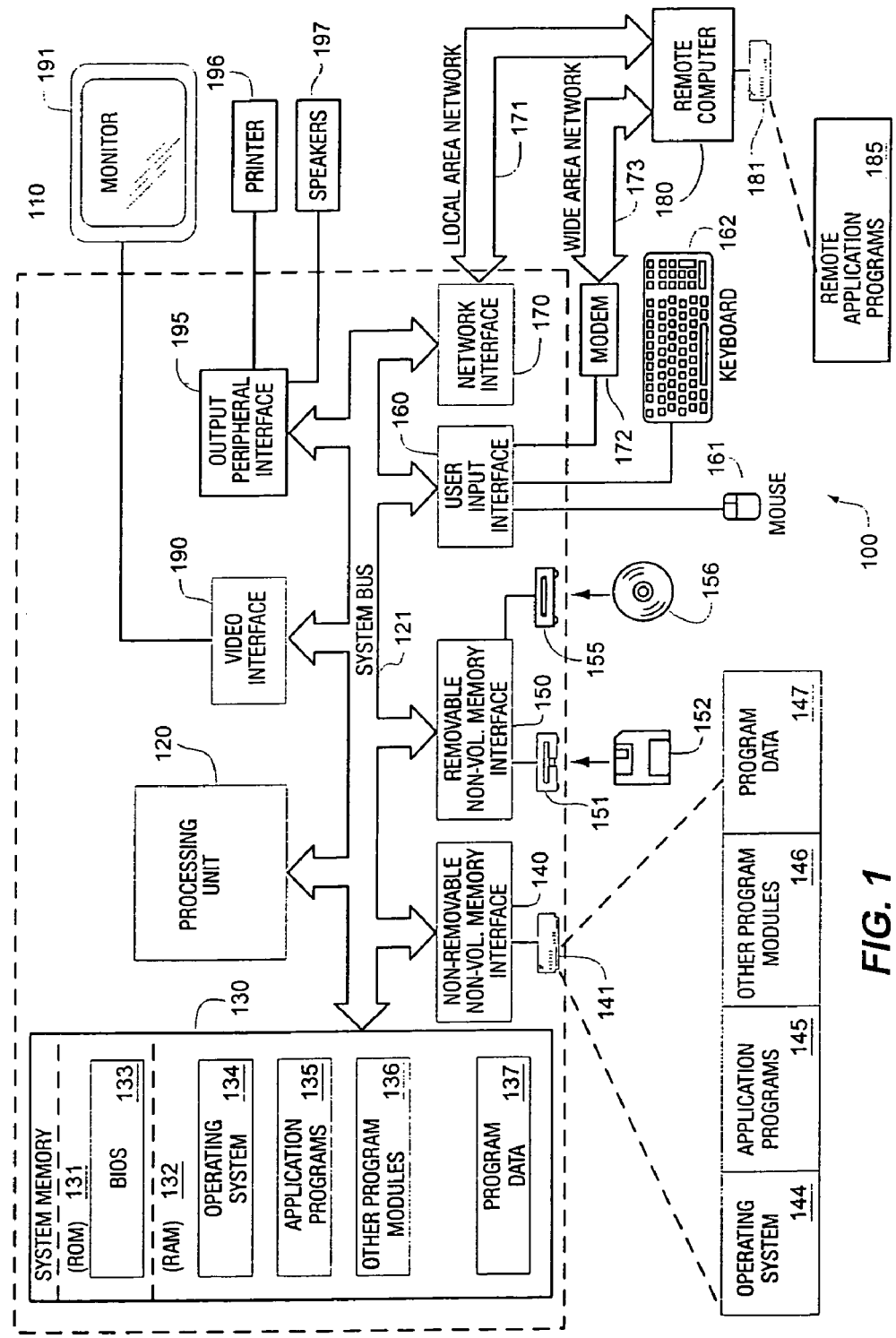
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
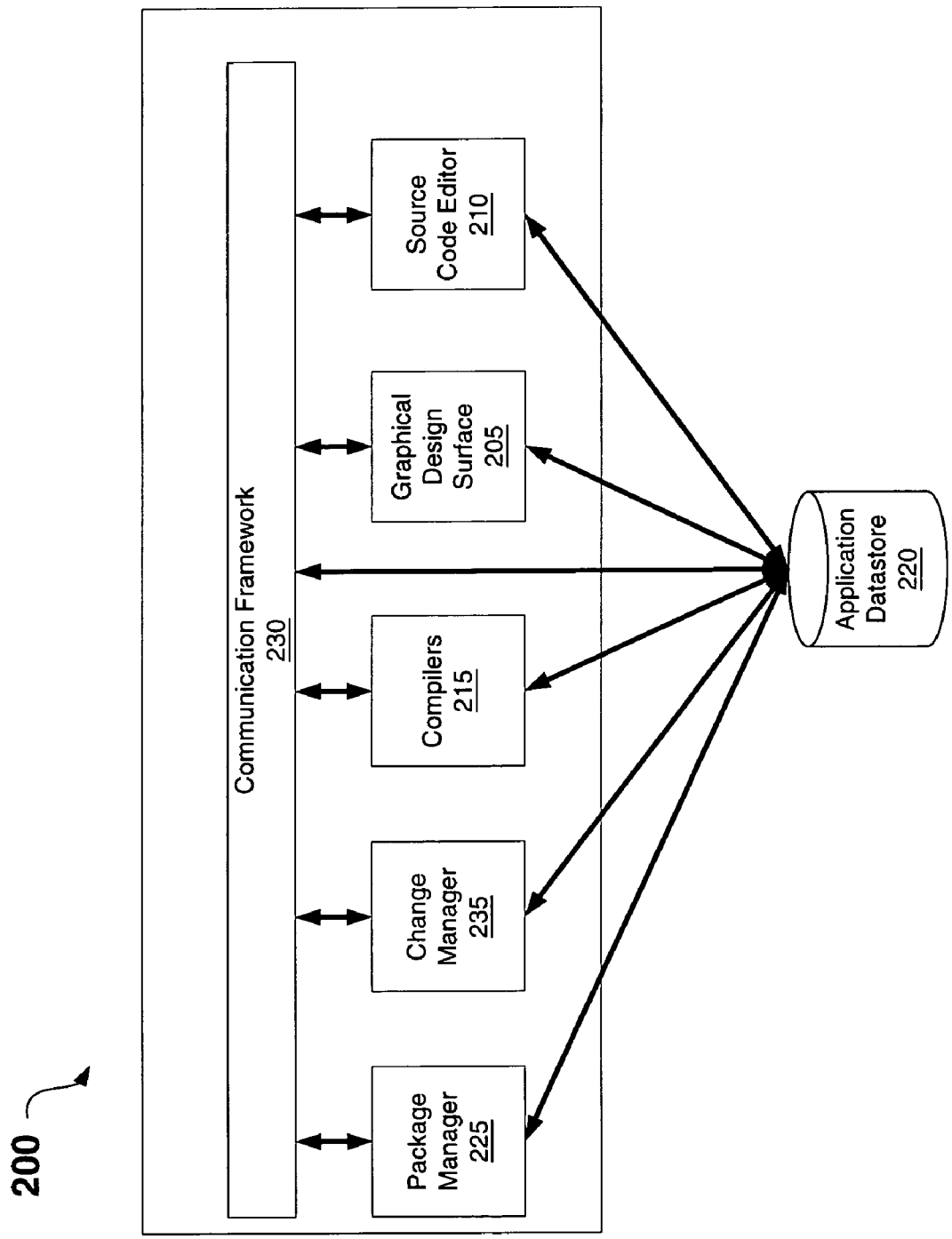
FIG. 2 is a block diagram illustrating a system according to an embodiment of the invention that provides a visual software development.

FIG. 2 illustrates a development environment 200 by which a programmer, or a team of programmers, can fully develop a software application by diagramming the application, allocating components, identifying interfaces, specifying databases, testing and debugging the application, and deploying the application for distribution.

Within environment 200, application datastore 220 stores the source code and data structures for the software application that is being developed. In one embodiment, the application is stored as source code with embedded annotations. In another embodiment, the annotations can be stored separately from the source code. In yet another embodiment, the application can be stored in tables in a database such as SQL Server and the code is "derived" from the tables.

Graphical design surface 205 and source code editor 210 provide two distinct views of the software application. Design surface 205 provides a graphical view by which a programmer defines the components of the software application such as software modules, interfaces, libraries, and databases. Source code editor 210 allows the programmer to directly edit the source code for the software application.

According to the invention, environment 200 provides a bi-directional development tool. Updates can be made via either design surface 205 or source code editor 210. In either case, application datastore 220 is updated to reflect the updates. Changes made graphically within design surface 205 are immediately apparent within the source code editor 210. Similarly, changes made within the source code editor 210 are immediately reflected by design surface 205. In this manner, design surface 205 and source code editor 210 of environment 200 are synchronized during the development process. Design surface 205, therefore, is an alternate view of what can be seen textually in source code editor 210. The code and structure presented textually within source code editor 210 can be derived from the graphical representation and vice versa.

In this fashion, unlike conventional modeling tools, graphical design surface 205 represents an actual physical model, rather than a logical model, in that the model is always defined by physical entities or proxies for physical entities. The entities include, but are not limited to projects, components, interfaces, libraries, databases, etc. Proxies for physical entities are used when the design surface is used as a "whiteboard" to lay out the architecture of a system before the actual physical entities are well defined. Design surface 205 provides not only a method for modeling the software application but a means for graphically constructing the software application. This preserves all semantic data during development that would otherwise have been lost. Because the graphical model displayed by design surface 205 is a physical representation of the code (and vice versa), environment 200 ensures that design surface 205 stays up to date as the software application evolves through debugging and deployment. This does not imply that either the graphical or textual views of the program display all information about the system. However, where information or structure is represented in both, it is equally up-to-date. In one embodiment of the invention, the text form is a strict superset of the graphical; however, in alternative embodiments, hidden non-visual textual attributes are used to annotate the text.

Communication framework 230 provides a mechanism by which the various components of development environment 200 communicate. It is through communication framework 230 that changes propagate from source code editor 210 to graphical design surface 205 and vice versa. In one embodiment, the various components of development environment 200 comply with the Component Object Model (COM) such that the communication framework represents the COM interfaces.

Compilers 215 represent one or more software compilers such as Visual Basic, Visual C++ and Visual J++ provided by Microsoft Corporation of Redmond, Wash. Development environment 200 invokes one or more of these compilers 215 to generate machine executable software from the source code and structures stored by application datastore 220. In addition, compilers 215 can have a code generation component for generating appropriate source code when the programmer updates the graphical objects displayed via design surface 205.

Source code control and version control of objects in the system is tightly integrated with development environment 200 via change manager 235. For example, by selecting an object on design surface 205, the programmer is also able to view the history of the object and is able to determine when the object was created, when it was modified and by whom. In addition, the programmer is able to view other versions of the source code for each component. These other version can include older versions of the software, or other versions of the software being developed in parallel by other teams of software developers. In one embodiment of the invention, the change management system is the Microsoft SourceSafe® version control system. However, the invention is not limited to any particular change manager, and in an alternative embodiment of the invention, all information in the datastore 220 is versioned. In this embodiment, objects on design surface 205 have graphical indications of changes to the object. For example, strikethrough or other visual representations can be used to indicate an object has been deleted or modified.

Design surface 205 allows the programmer to visually specify the packaging requirements for the software application. The programmer can create packages and populate them with different components of the software application. Within design surface 205, packages can be collapsed such that the contents are listed and the "imports" and "exports" are collapsed into a single representation. Alternatively, the programmer can direct design surface 205 to display an outline around the components of a particular package instead of collapsing the package. The programmer is able to set packaging-specified properties when the package is selected within design surface 205.

Once the packing requirements have been defined, a programmer is able to specify deployment groups. A deployment group is a collection of packages that are deployed to a common location. For example, a three-tier application might have client, server, and database deployment groups to represent the tiers. Design surface 205 also visually represents deployment groups.

To actually deploy an application, development environment 200 invokes package manager 225 by which the programmer maps the logical groupings to physical machines. When a deployment map is opened, package manager 225 presents the user with a matrix of known machines and defined deployment groups. Within the matrix, the programmer indicates whether a specified group should be deployed to a given machine. Package manager stores the deployment map in application datastore 220. When the programmer issues a deploy command, development environment 200 invokes compilers 215 to build the software application. The packages are constructed, and the specified deployment map is used to determine the physical targets for the built elements.

Methods of the Invention

In the previous section, a system level overview of the operation of an exemplary embodiment of the invention was described. In this section, the particular methods of the invention performed by an operating environment executing an exemplary embodiment of the invention are described by reference to a flowchart shown in FIG. 3. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIG. 3 are inclusive of the acts required to be taken by an operating environment executing an exemplary embodiment of the invention.

Figure 3:
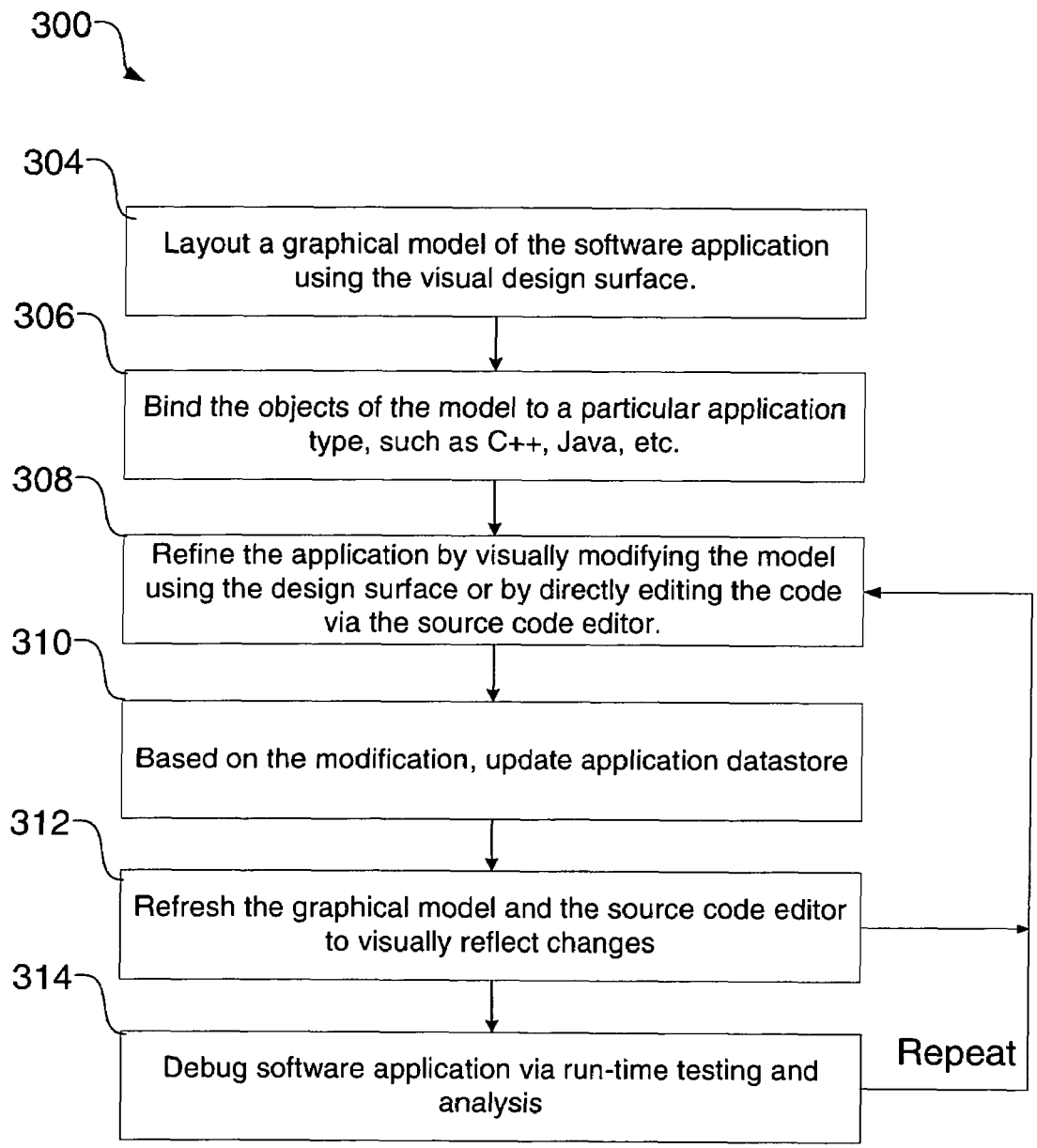
FIG. 3 is a flow chart illustrating one method of providing a visual software development environment.

FIG. 3 is a flow chart 300 illustrating one method of operation by which a programmer, or a team of programmers, can use development environment 200 to model and implement a software application in a manner where design surface 205 and source code editor 210 are integrated and synchronized to immediate reflect changes made to the code within the each other.

In block 304, the programmer defines an initial graphical model of the software application to be developed. This allows the programmer to visualize the various components of the software application and their interactions.

In block 306, the programmer begins to convert the components of the model into physical implementations by "binding" an object to a compiler 215 corresponding to a language in which the object will be implemented. For example, a component may be bound to a particular compiler 215 such as Visual C++. Once a component is bound, design surface 205 displays the component differently so as to visually illustrate the binding. In addition, although a component can be bound, not all sub-components need necessarily be bound. In this manner design surface 205 supports partial implementation. According to the invention, binding is reversible, although manually entered code may be lost. This feature makes it easy for programmers to experiment with various designs, and to understand how various languages interpret the fundamental framework.

It must be noted that the concept of binding is not limited to binding a component to a compiler 215. Components can also be bound to a database, including the columns, stored procedures, and events defined within the database. In addition, components can be bound to a project, which may result in a binding to a particular language compiler.

In addition, it is not necessary to bind all components represented on a design surface. Some components can be left unbound for binding at a later time. As components are bound, code is generated. Furthermore, components can be rebound at a later time. For example, a component that is initially bound to a particular C++ compiler can later be rebound to a Visual Basic compiler, or a Java interpreter. Thus embodiments of the invention support the manner in which users actually work—making design decisions just-in-time rather than all in advance.

In block 308, the programmer refines the application either by changing the model via design surface 205 or by directly modifying the source code via source code editor 210. When the programmer adds new objects to design surface 205, additional code is automatically generated. Similarly, if the programmer deletes objects from design surface 205, newly generated code will reflect the deletion. In block 310, application datastore 220 is updated to reflect any additional code as well as any modified code. In block 312, design surface 205 and source code editor 210 are synchronized to reflect the changes. For example, if the programmer changes the name of an interface or class within source code editor 210, design surface 205 immediately reflects the change. As changes are found, they are broadcast to registered listeners, such as compilers 215, which then can proceed to background compile the changed code. Block 308 through 312 are repeated as the programmer refines the software application. In addition, the programmer may incorporate run-time feedback (block 314) into the process to further debug the software application.

An Exemplary Embodiment of the Invention

Figure 4:
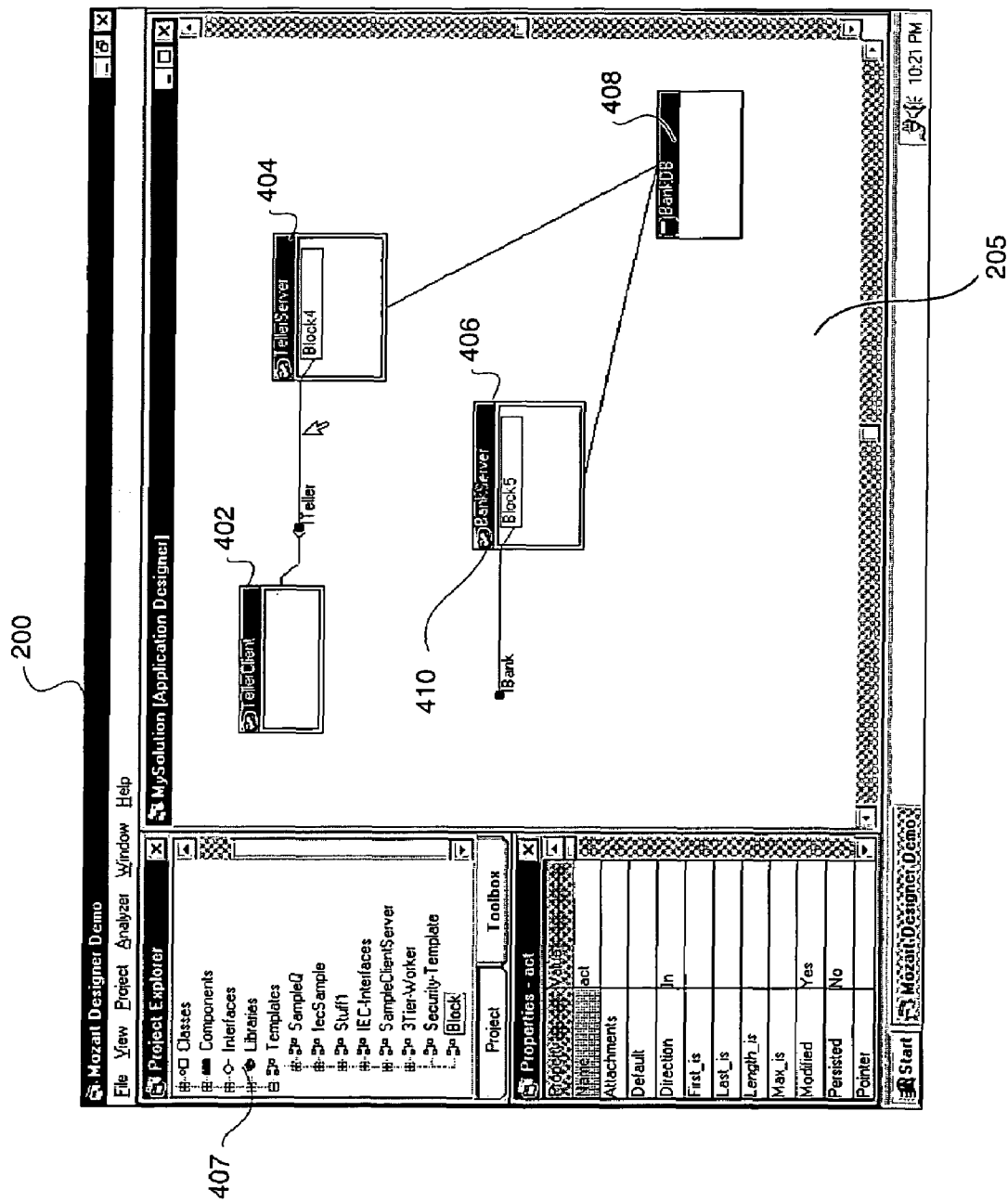
FIG. 4 is an illustration of a design surface within a visual software development environment according to an embodiment of the invention.

FIG. 4 illustrates one embodiment of development environment 200 executing on computer 100. In this example, design surface 205 of development environment 200 is presenting a graphical view of a software application in an early stage of development. Here, the programmer has defined four components on design surface 205: teller_client 402, teller_server 404, bank_server 406 and bank_database 408. Toolbox 407 lists a variety of classes, components, interfaces, libraries and templates that the programmer can use to quickly construct the software application. When the programmer selects and drags these items onto design surface 205, development environment 200 automatically generates the appropriate source code, including all interface code, data structures, etc., and updates application datastore 220. In addition, the programmer can drag the objects onto source code editor 210 instead of design surface 205. The effect is the same: source code will be generated and added to application datastore 220. In either case, source code editor 210 and design surface 205 immediately reflect the changes.

Figure 5:
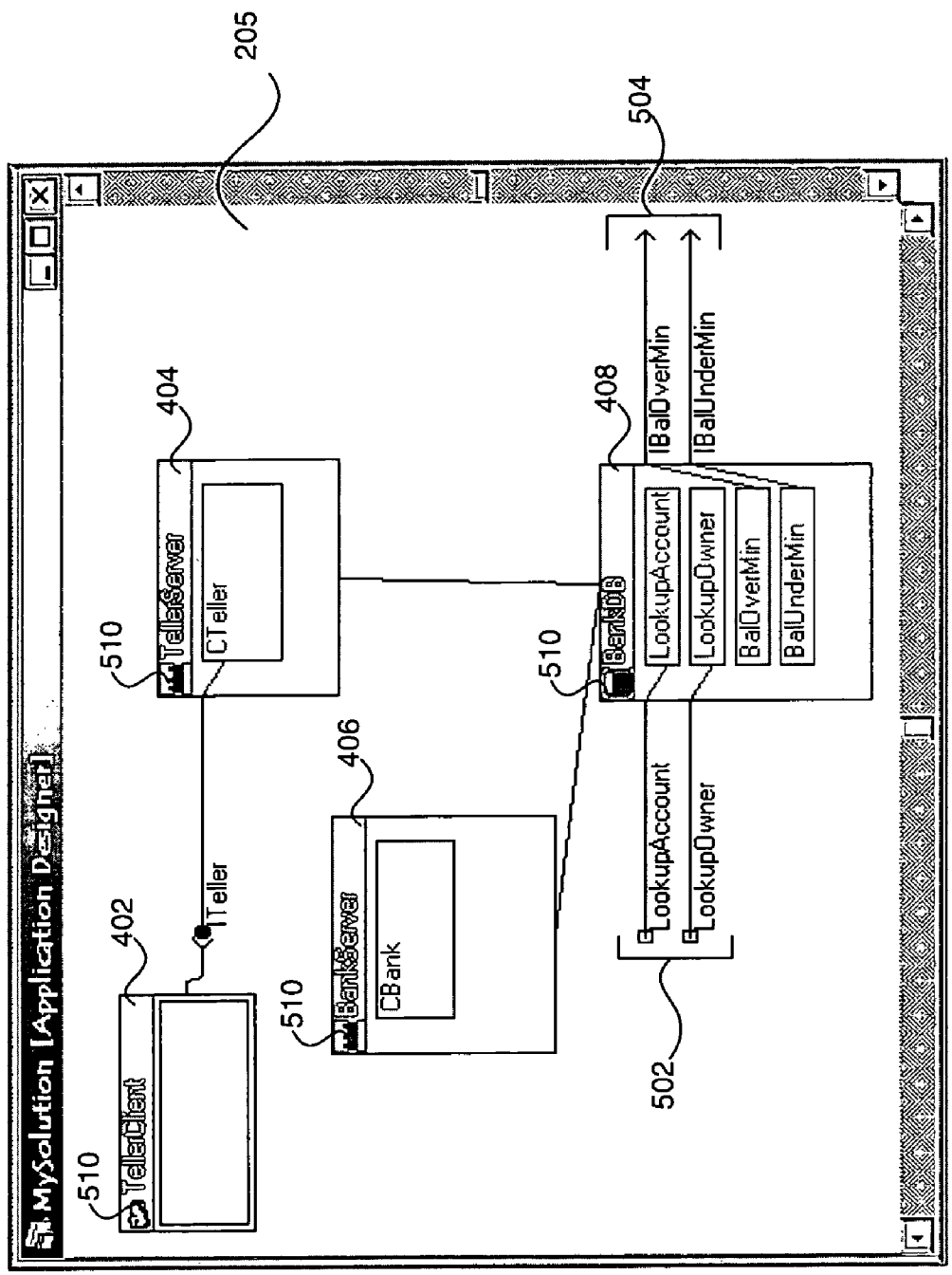
FIG. 5 is an illustration of a design surface showing software component interfaces according to an embodiment of the invention.

As illustrated in FIG. 5, teller_server 404 and bank_server 406 have been bound to the "C++" programming language, but teller_client 402 has not been bound to any particular programming language. In addition, bank_database 408 has been bound to a specific database. Icons 510 are used to indicate a design component has been bound to a particular language or database.

In this embodiment, binding to a database can be accomplished by specifying a DSN (Data Source Name) that uniquely identifies the database. The system can then use the DSN to obtain the programmatic elements available in the specified database (i.e. bank_database 408), which are displayed by design surface 205. Stored procedures are identified as callable interfaces 502, such as LookupAccount and LookupOwner, while signaled events 504 are shown as outputs, such as IBalOverMin and IBalUnderMin.

After binding a database, source code editor 210 provides direct access to database stored procedures as normal function calls within the source code, thereby allowing the programmer to easily develop an interface to bank_database 408. In addition, the programmer can drag database fields from design surface 205 onto the source code within source code editor 210 in order to create bindings to the associated database. This allows developers to data bind specific variables within the source code.

Figure 6:
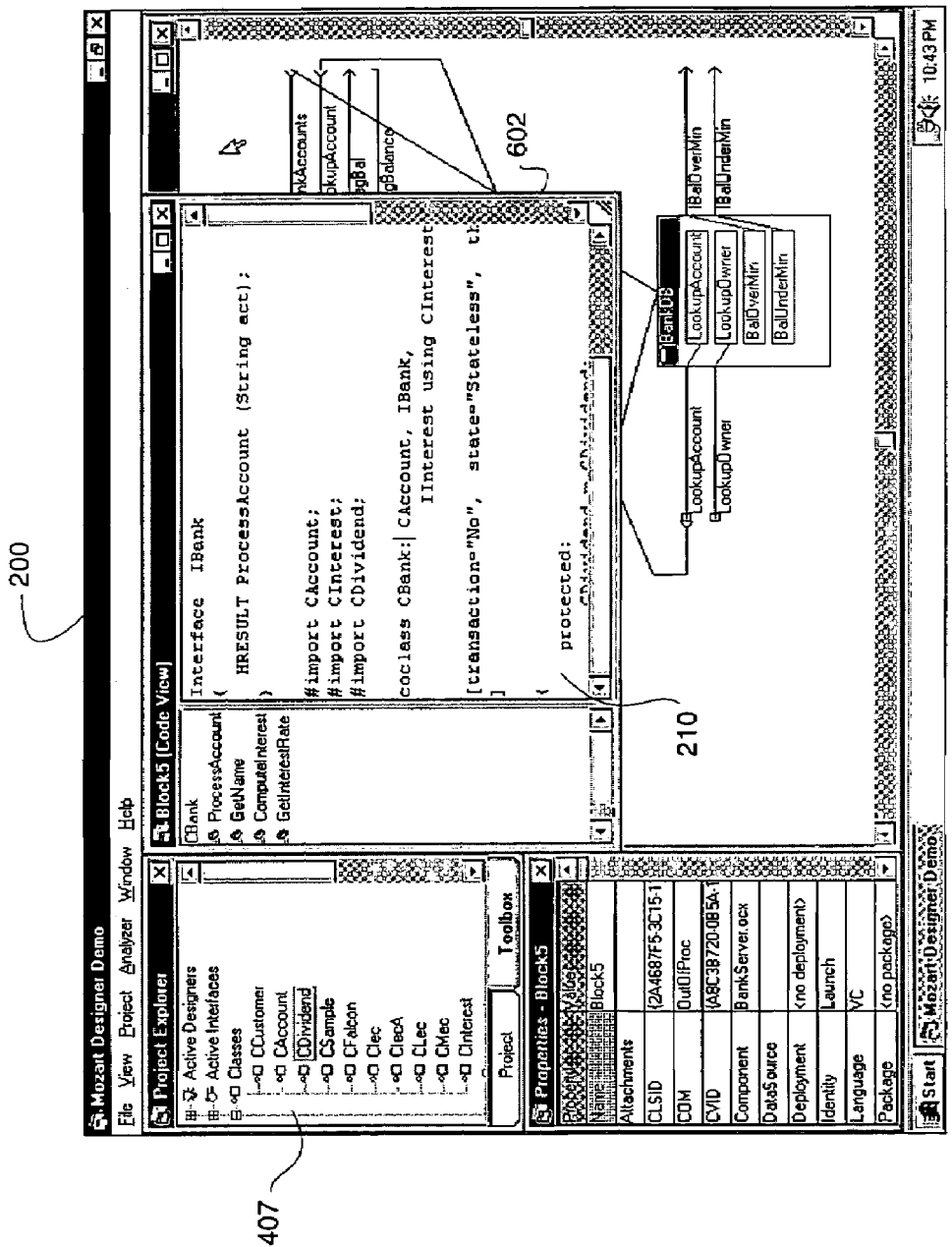
FIG. 6 is an illustration of a design surface that includes a software text editor according to an embodiment of the invention.

FIG. 6 illustrates an exemplary screen of development environment 200 when the programmer is simultaneously viewing design surface 205 and source code editor 210. In this exemplary screen, bank_server 406 has been bound to the C++ language. As a result, C++ code for the component is generated, and is displayed by source code editor 210 in editor window 602.

Drag & Drop Class Construction

Figure 7:
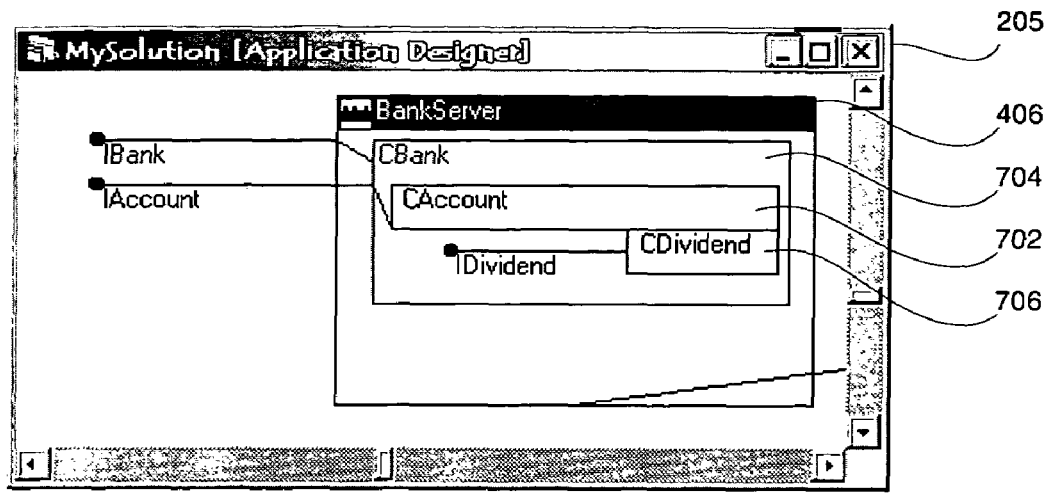
FIGS. 7 and 8 are illustrations of design surfaces that show class containment and inheritance.

According to one aspect of the invention, design surface 205 supports graphical construction of software classes and class hierarchies. The programmer can drag a software class from any component within environment 200, such as a toolbox, project, source code, or model diagram, and place the component onto other component on the design surface 205. This allows the programmer to quickly associate one class with another. The association can be one of inheritance, containment, or aggregation. As an example, FIG. 7 illustrates the design surface 205 when the programmer drags a CAccount class 702 onto a CBank class 704 and specifies that CBank class 704 inherits from CAccount class 702. In addition, the programmer is able to drop a class onto another class and indicate that it is contained within the class. As illustrated in FIG. 7, CDividend class 706 is "contained" within CBank class 704. Contained objects are those that are fully consumed by an another object, i.e., the interfaces of the contained object are not externally exposed to other objects within the software application. Thus, a contained object is similar to a private member variable in object oriented languages such as C++. The interfaces of the contained object are only available to the container object. Design surface 205 graphically illustrates containment and derivation for all defined classes. In addition, for each defined class design surface 205 illustrated exported class interfaces, exceptions, and events subject to the programmers desired level of abstraction.

Figure 8:
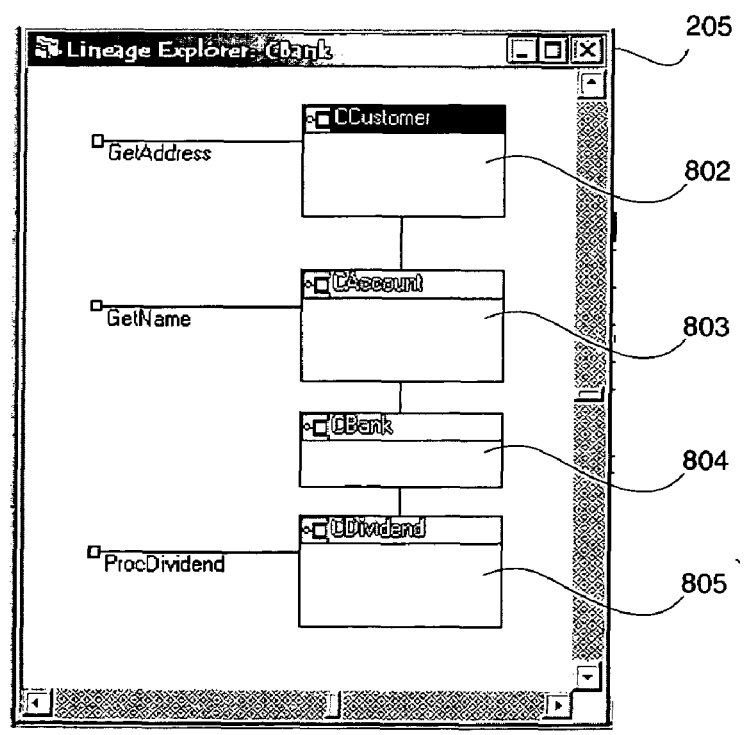

In addition, design surface 205 allows a programmer to view the lineage of a class in greater detail by graphically representing class relationships including containment, inheritance, and aggregation. FIG. 8 shows design surface 205 graphically displaying a class lineage having four classes: CCustomer 802, CAccount 803, CBank 804 and CDividend 805. In this view, design surface 205 displays where the methods are defined within the class hierarchy. For example, if a given class overrides a base class' member function, then design surface 205 displays the method as associated with the overriding class. Otherwise, design surface 205 displays the method on the base class. The exemplary class lineage window illustrated in FIG. 8 also supports renaming and modification which is then reflected in the code. In addition, the exemplary class lineage window can be used for navigation to interfaces and classes represented by the objects within the window by pointing an clicking on the desired object.

Interface Design

Figure 9:
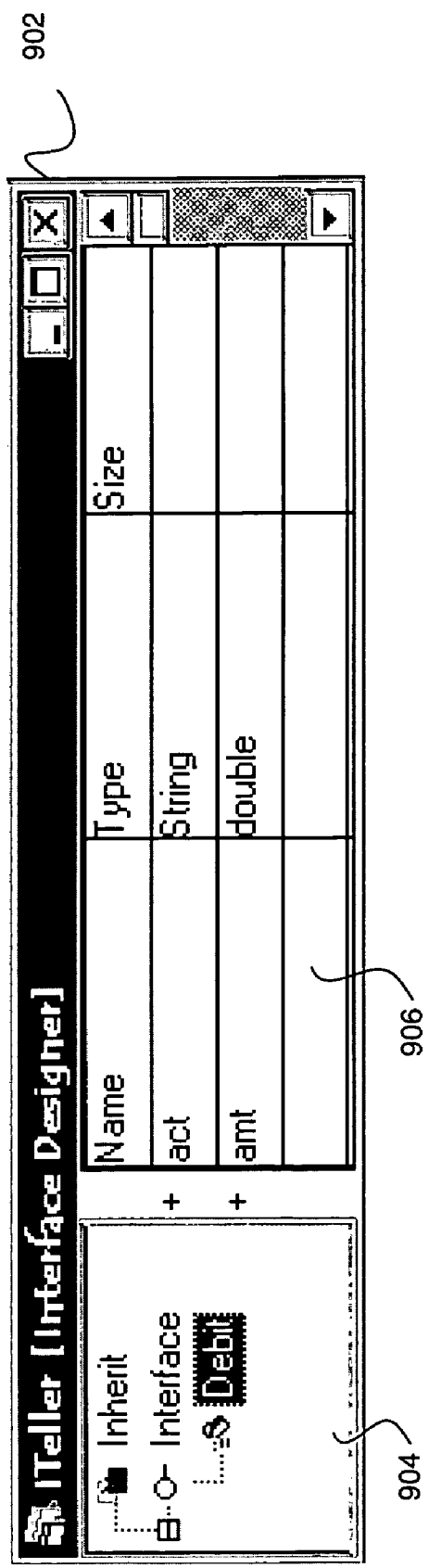
FIG. 9 is an illustration of a design surface according to an embodiment of the invention that shows an interface designer.

In one embodiment of the invention, illustrated in FIG. 9, design surface 205 includes an interface editor 902. The definition of the interfaces is a key aspect of an application and an integral part of the design surface. The interface editor 902 includes an interface node tree 904, and an interface property grid 906. The interface editor 902 thus allows users to define the methods on an interface, as well as the arguments, fields and properties of the methods. In the example presented in FIG. 9, the "Debit" method of the ITeller interface has been selected. Property grid 906 shows that the Debit method has two arguments, an "act" argument and an "amt" argument.

Users can drag existing interfaces and methods onto the interface editor 902. When an interface is dropped on the "inherit" node of node tree 904, the interface being edited is updated to inherit from the dropped interface. If an interface or method is dropped on the "interface" node, then the specified method, or all methods on the specified interface, are copied into this interface. This allows developers to quickly create interface definition from other definitions, or to create inheritance relationships between interfaces.

When an interface is attached to a class (either via code or by dragging it to the design surface), the developer can specify if the interface is a required or optional interface. Required interfaces must be connected to providers of the interface on the diagram. Until the connection is made, the diagram is annotated to indicate that not all requirements have been met (this is also true of database and library requirements). In one embodiment of the invention, the annotation comprises a small red "x" marking in the lower right corner of the interface window.

In addition, new interfaces can be created by modifying existing interfaces. When a user modifies an existing interface, the system prompts the user and asks if a new interface should be created. If a new interface is to be created, the design environment 200 maintains the old interface for the object using change manager 235, and creates the new interface within the object, thereby supporting both interfaces for backward compatibility.

As is known by those of skill in the art, an interface is a programming contract between the producer of the interface and consumers of the interface. The contract specifies the methods and properties through which consumers communicate with the interface producer. Because there can be many consumers of an interface, versioning is critical. This is because the consumers may have been designed at different times during the evolution of the producer interface. The design surface 205 manages this version information in several ways. The developer can manipulate the metadata associated with interface, or the interface definition itself to mark an interface as frozen. Once this occurs, changes will be interrupted for user feedback on how to proceed. The developer can abort the operation, update in place (advanced) or version the interface.

In addition, the user can cause the design surface 205 to create a new interface and delegate the implementation from the old interface to the new one automatically. The code managed by change manager 235 is immediately updated to reflect this. Furthermore, the user can request that the system create a tear-off DLL to support the backward functionality. The development environment 200 automatically determines the appropriate version of the old interface, along with other interface modules to include in the tear-off DLL.

As noted above, connections can be made between a producer interface and a consumer of the interface. When a connection is made between the interfaces of various components, the programmer can right-click on the graphical link between the objects and edit the properties of the connection. This allows the programmer to specify any machine specific or connection-specific binding or routing properties that might be expressible to the underlying system. For example, load balancing properties for COM interfaces can be specified here.

Finally, when a developer makes a connection between two components, one aspect of the connection is the version of the interface and component. The design surface 205 will track this information and embed it into the application (where possible).

Visual Development Environment Having Change Tracking (Visual Change Tracking)

Development environment 200 tracks changes and provides a visual indication of the changes. In other words, the design surface 205 is versioning aware. This means that developers can see visualizations of changes while developing an application. Thus the design surface provides a means for developers to make appropriate changes to ensure compatibility between versions.

Changes can be expressed in various ways. In one embodiment of the invention, change bars and squiggles are displayed to reflect changes to interfaces, methods, and properties. In addition, elements of the diagram displayed in the design surface 205 that have changed are highlighted. Finally, changes to source code are flagged with change bars.

In a further alternative embodiment of the invention, whenever the mouse is moved over a change indicator, details of the change are presented in a tool tip. As an example, and not by way of limitation, the date, author, and check-in comment of the change are displayed.

In a still further embodiment of the invention, the design surface 205 includes a history window. The history windows tracks and displays the change history of the elements that are selected, both on the surface, in the source code, and elsewhere in the development environment. This window provides a detailed history of changes to the object. Information displayed in the window can be obtained from change manager 235 (FIG. 2). In addition to the history window, alternative embodiments of the invention indicate changes to objects by providing graphical annotations. These graphical annotations include, but are not limited to, colored boxes for new and modified components, and strikethrough for deleted components. Additionally, annotations can track changes both to object names and to their contents and semantics Templates & Designers The visual design surface 205 provides support for templates and designers. Templates are a way of "jump-starting" developers by giving them pre-configured solutions that are fully integrated with the design surface. A template is a collection of components. For example, it may be two components and their interfaces, or it can be a large number of components such as classes, databases, projects, etc. A designer is a visual component whose persistence in code is computed dynamically by the component rather than by the underlying system. This is useful as a way of abstracting technology.

Figure 10:
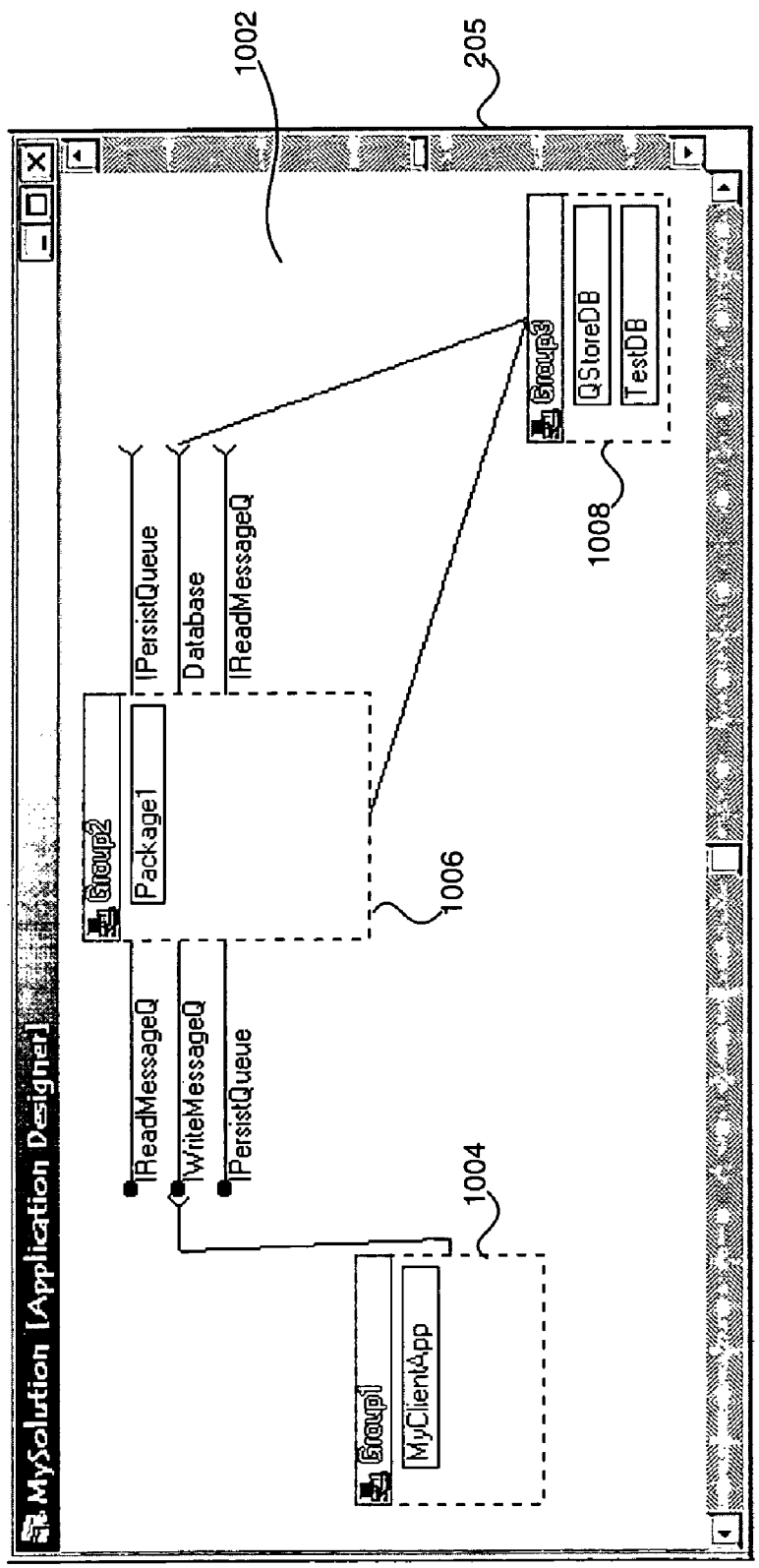
FIG. 10 is an illustration of a design surface that provides a template according to an embodiment of the invention.

FIG. 10 illustrates a design surface 205 that supports an exemplary template 1002. A template is a pre-configured set of elements on the design surface. Templates can be opened if they represent an entire solution or added to an existing solution if they only contain portions of a project. As illustrated in FIG. 10, the exemplary template 1002 contains a three-tier application comprising a client application 1004, a message queue server 1006, and a database server 1008, and further includes packaging, deployment, and database information for the components.

In one embodiment of the invention, template definitions are stored in a template file or set of files. In an alternative embodiment, template definitions are stored in a persistent storage unit, such as a database.

In one embodiment of the invention, templates are brought onto the design surface 205 by dragging a desired template from a toolbox. In an alternative embodiment of the invention where the templates are maintained as files in a file system, an icon representing the file can be dragged onto the design surface 205 causing the template to be instantiated within the system. In a further alternative embodiment, the user can search a persistent store for templates and drag the result of the search to the design surface 204 or to the toolbox.

Figure 11A:
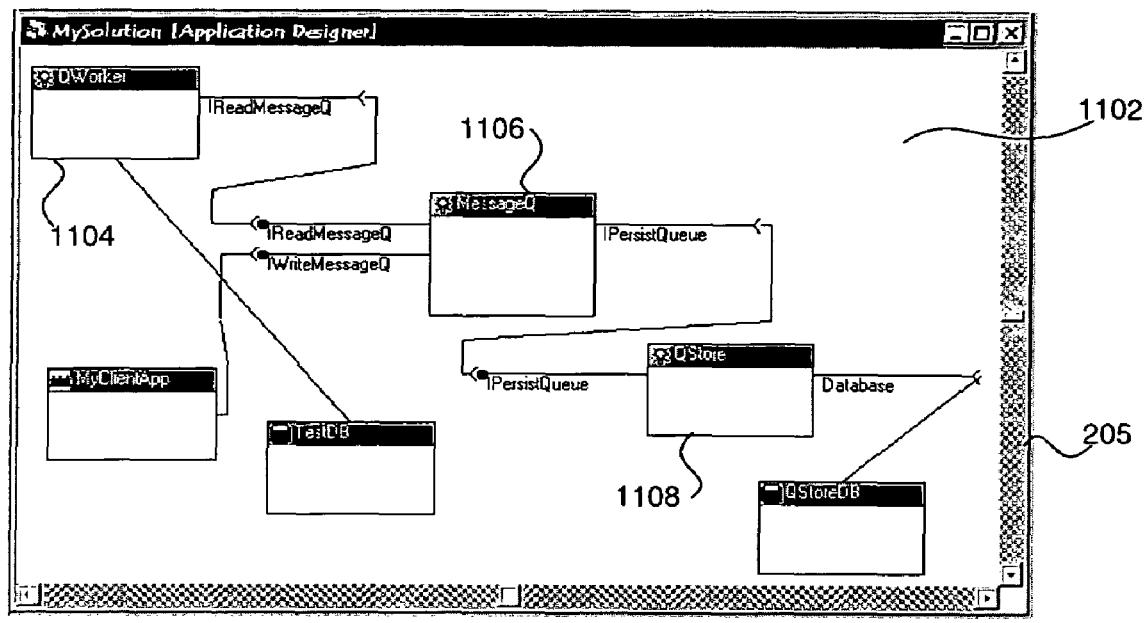
FIGS. 11A and 11B are illustrations of a design surface that provides an component designer according to an embodiment of the invention.
Figure 11B:
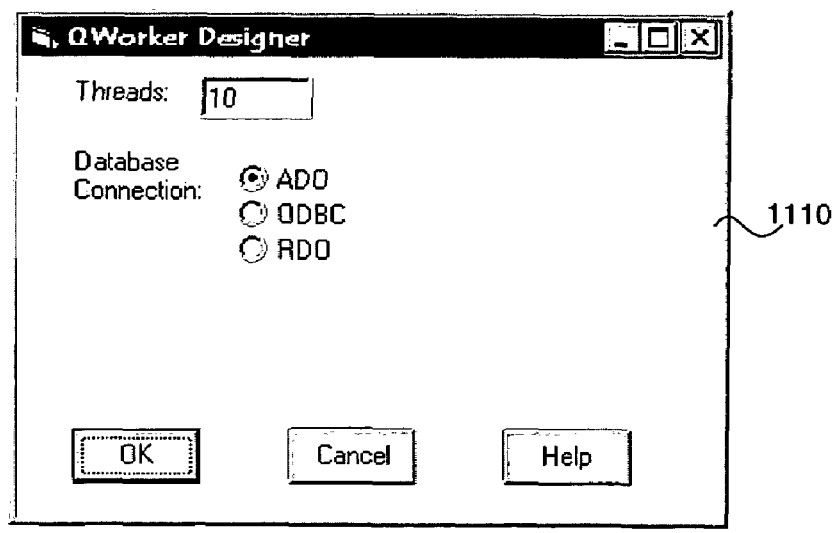

FIGS. 11A and 11B illustrate a designer according to an embodiment of the invention. In this embodiment, design surface 205 supports two kinds of designers: applied and active.

An applied designer augments code as it is dropped onto an object. For example, an applied designer can convert non-wide character strings into wide strings (wide and non-wide character strings are known in the art). These types of designers typically process source code and update it. A property of a component/class/interface indicates the passive designers that have been run on it.

An active designer is a component that has its own rendering on the design surface and manages the code behind the designer itself.

FIG. 11A illustrates an exemplary designer 1102 presented on design surface 205. The exemplary application comprises three designers: Qworker 1104, MessageQ 1106, and Qstore 1108. These designers abstract the use of the message queuing system and simulate load on a message queue. Messaging systems, as is known in the art, provide reliable asynchronous communication between systems. In one embodiment, the message queue system is the Microsoft® Message Queue (MSMQ).

Developers use property pages (and custom UI) to configure a designer. As the designer is changed, it automatically updates the code behind it. Some designers may support two-way code updates, although it is not a requirement. An exemplary custom UI is illustrated in FIG. 11B. As shown, the exemplary UI screen 1110 provides an interface for providing configuration parameters for the Qworker designer 1104 (FIG. 11A). A typical use for a designer is to write the "glue code" around customer components. For example, a company can sell a complex business component and provide a designer that wraps the object providing a nice configuration UI (User Interface) which generates template code for calling the control.

In this manner, the design surface 205 acts as a buffer between the designer 1102 and the underlying code and project system thereby ensuring the diagram is accurate.

Team Oriented Development

In an embodiment of the invention, the design environment 200 supports team oriented project development. In team oriented development, multiple members of a development team can be working on a project concurrently. In one embodiment of the invention, the design surface 205 provides integrated security to specify which developers "own" a particular code module, and which developers have rights to perform particular actions. These access rights include the right to create new versions, the right to modify source code, and the right to read the source, code. For example, a first developer can be given the ability to version an IFoo interface, while a second developer can be given the right to modify the definition of a CBar class. In one embodiment, security is specified in terms of discretionary access controls.

A further aspect of the invention is the ability to notify team members of changes to the project. As changes are made to components in the application, the design surface 205 notes changes that can effect other members of the development team that can be working concurrently on the project. As changes are made that effect other team members, the design surface 205 notes the changes and automatically informs the other developers. In one embodiment of the invention, notification is provided by a project-wide to-do list maintained by design surface 205. It is desirable to maintain such a project-wide list, because it provides a context for monitoring both changes to the project, and when further changes required by an initial change have been implemented. For example, assume a developer has changed an interface by adding an "IFoo2" method meant to replace an "IFoo" method. The team manager may want to know when the team members have switched from the use of the "IFoo" method to the "IFoo2" method. As a further example, if an interface method is changed from one to two arguments, owners of any piece of code that references the method will be notified that the code has been updated. Since this change information is tracked, the originator of the change can see all the places where the code must still be changed. The project-wide to-do list provides the context for monitoring the required changes. Thus the embodiments of the invention provide a versioning aware, team-oriented design environment.

In alternative embodiments of the invention, other forms of notification instead of, or in addition to, a project-wide to-do list are provided. For example, an e-mail can be sent to an interested developer or developers when changes to the project are made. Alternatively, an "instant message" can be sent to the interested developer or developers. The invention is not limited to a particular method of notification.

A further team development aspect provided by embodiments of the invention is a team news channel. The team news channel is a window provided on design surface 205 that presents one or more lines of team-related information with hyperlinks to more detailed information. Items that this window tracks include:

Checkins and checkouts
Build status (successes and failure)
Pending checkout requests
Project-related e-mail (send from the development environment)
Updates to consumed components
Requested notifications (e.g. changes to file x)
Updates to web sites that have been flagged as relevant (e.g. MSDN, the Microsoft Developers Network web site)

Figure 12:
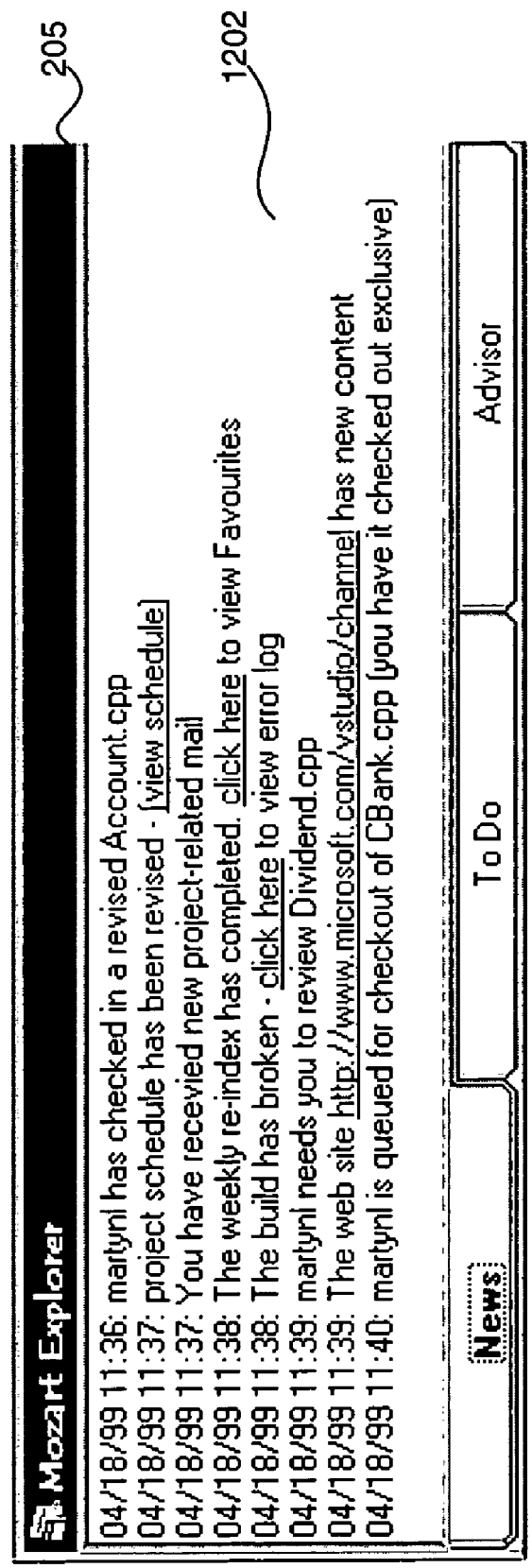
FIG. 12 is an illustration of a project news screen according to an embodiment of the invention.

Users can choose which of the above information they wish to subscribe to. FIG. 12 illustrates an exemplary news channel window 1202 displayed on design surface 205 according to an embodiment of the invention.

Integrated Testing

Figure 13:
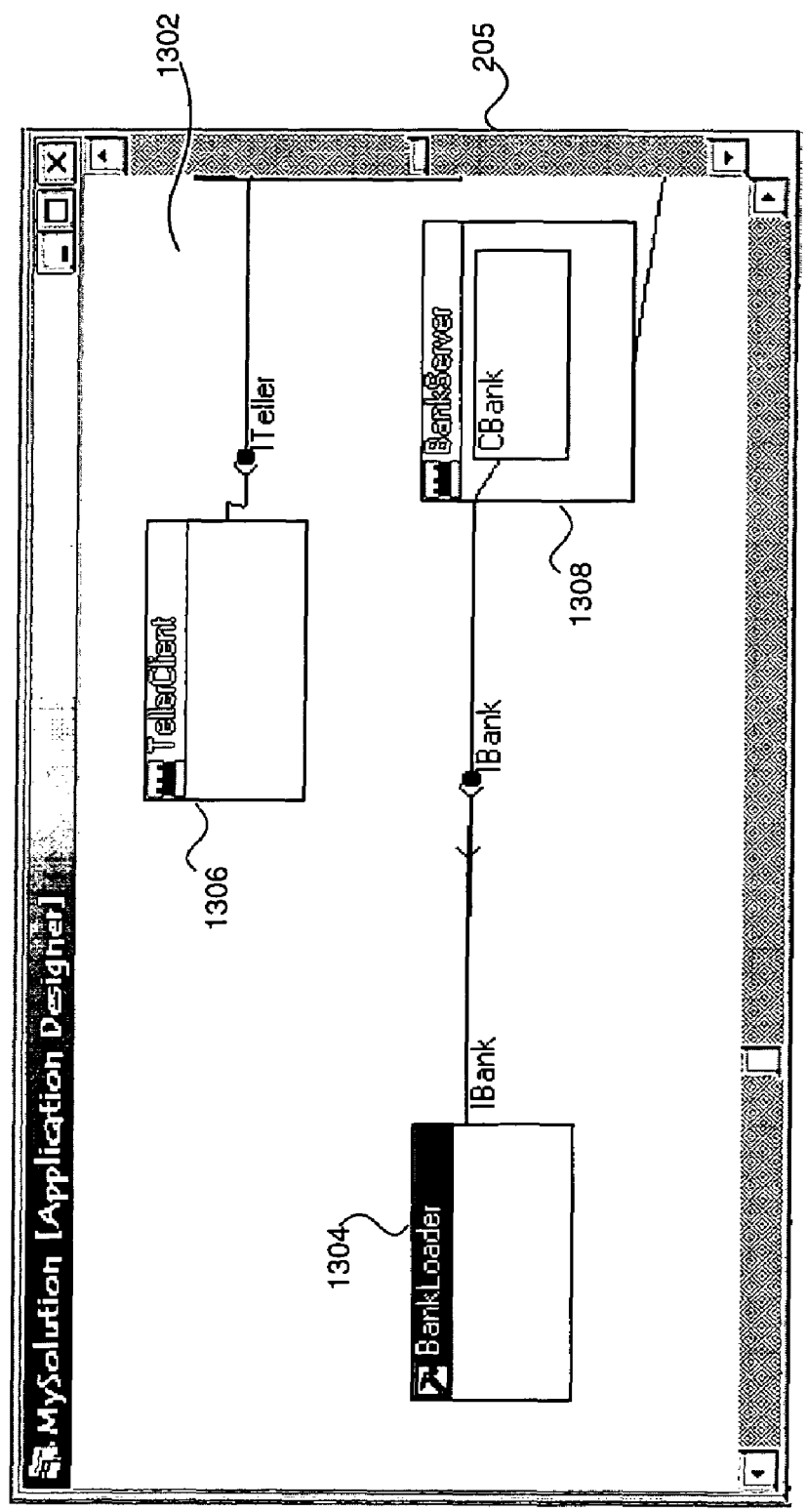
FIG. 13 is an illustration of a design surface incorporating an interface test module according to an embodiment of the invention.

The design surface 205 also provides support for integrated testing. Using designers such as those described above, specialized testing tools can be defined and associated with the application or component. FIG. 13 illustrates an exemplary testing configuration 1302 supported by design surface 205. Here, a graphical representation of an instance of a load testing tool 1304 is placed on the design surface 205 In the example presented in FIG. 13, the load test requires the IBank interface 1306, which is wired to the BankServer 1308. The load testing tool 1304 can be a. specially designed tool that tests the IBank interface, or it can be a generic tool that reads as input a specific test that utilizes the IBank interface. In either case, properties can be set on the load tester and when "Run Test" is selected, the load tester is executed.

In addition, the design surface 205 is integrated with the Visual Studio Analyzer. Objects can be selected and flagged as participating in Visual Studio Analyzer data collection. The analyzer runs outside of system 200 and collects information about a running applications. Filters are used to indicate what data is to be collected. Using the context of the design surface and the application or component (e.g. what objects are created and where they are deployed), an intelligent filter can be created.

Similarly, the design surface 205 can be integrated with a debugger. By selecting a class, component, interface, trigger, method, etc., a developer can specify breakpoints graphically. For example, when an interface is selected, the system causes the debugger to set a breakpoint on every method of the interface. When a breakpoint is reached, the current component is highlighted graphically on design surface 205.

Graphical Packaging and Deployment

Figure 14A:
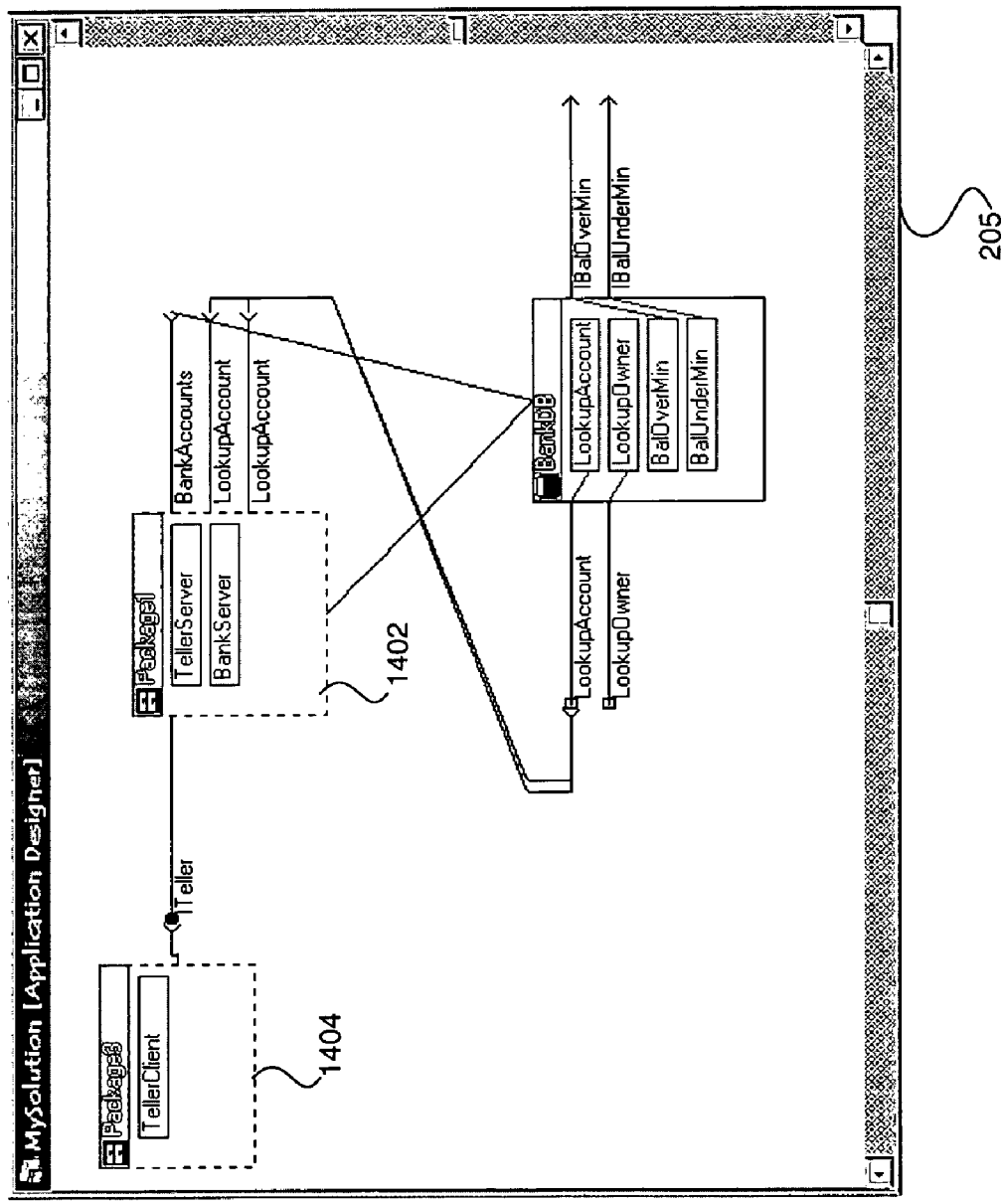
FIGS. 14A-14C are illustrations of a graphical software module packaging and deployment component according to an embodiment of the invention.
Figure 14B:
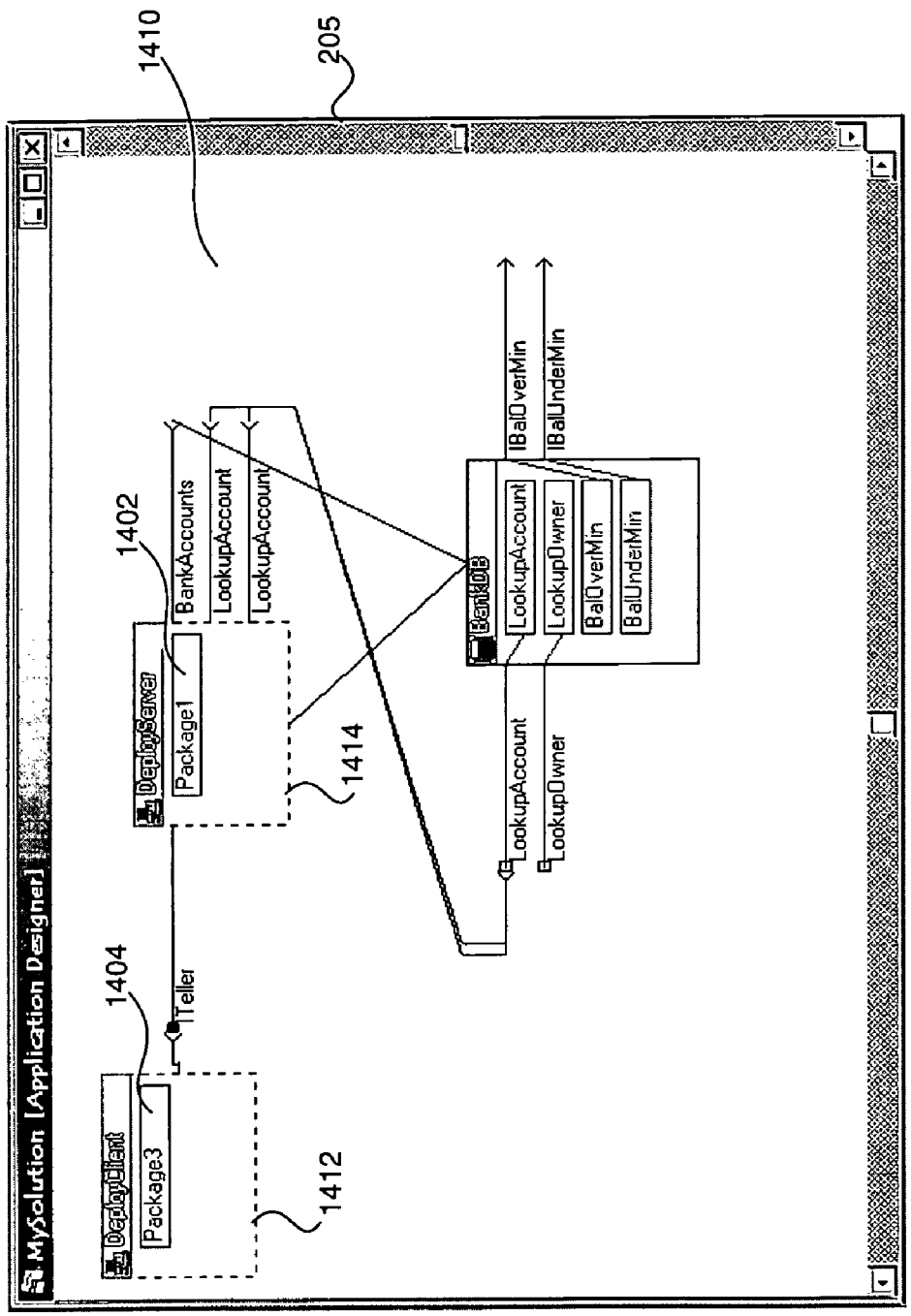
Figure 14C:
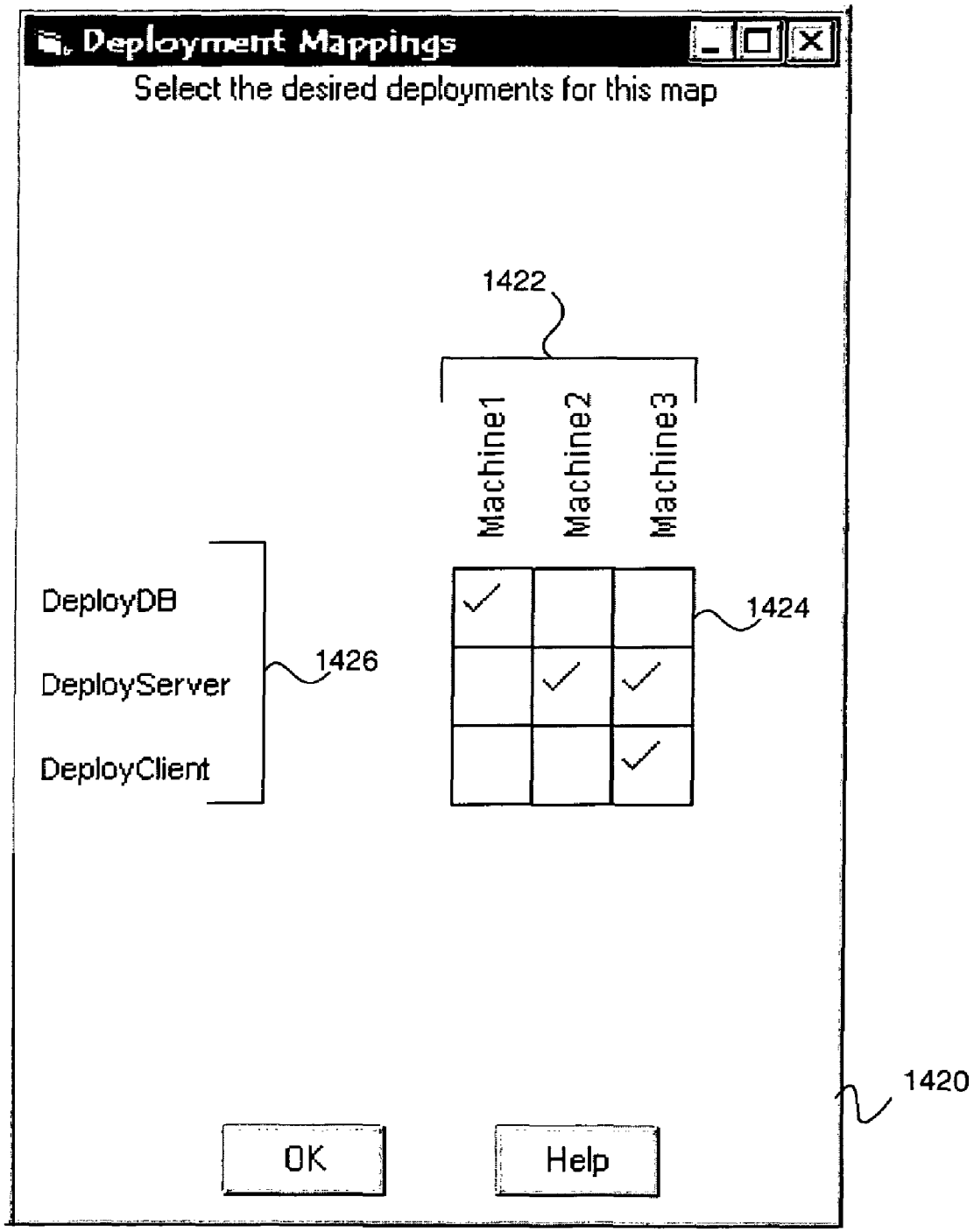

The graphical packaging and deployment of applications is a further aspect of the embodiments of the invention, and this is illustrated in FIGS. 14A-14C. Using this feature, a developer can define a package, and select one or more objects and group them together into the package by dragging the objects into the package. Upon selection, the interfaces for the selected components are rolled up and exposed as interfaces to a single package. In one embodiment of the invention, the developer creates a package and drags the components into the package. In an alternative embodiment of the invention, an outline can be drawn around the elements to be included in the package.

The developer can select a package and set the properties for the package, such as what type of container it is, what digital certificate will be used to encrypt and sign the package upon deployment. Through the design surface 205, the programmer can graphically navigate through the package and deployment information.

Collapsing a package according to an exemplary embodiment of the invention is illustrated in FIG. 14A. When a package is collapsed, the contents are listed and the "imports" and "exports" are collapsed into a single representation. In this example, the TellerServer component 404 and BankServer component 406 have been collapsed into the "Package1" package 1402. The TellerClient component 402 has been collapsed into a "Package3" package 1404. As shown in FIG. 14A, the interfaces that were once part of the individual components 404 and 406 are now shown as part of the integrated package 1402. The property grid in the development environment 200 is used to set property-specified properties when a package is selected. Double-clicking on a package automatically expands it.

A deployment grouping screen 1410 according to an embodiment of the invention is shown in FIG. 14B. In this embodiment, after the packing requirements have been determined, a developer can then specify deployment group. A deployment group is a collection of packages that are deployed to a common location. For example, a three-tier application might have client, server, and database deployment groups to represent the tiers. Deployment groups are also represented on the design surface 205.

In the exemplary deployment group screen shown in FIG. 14B, two deployment groups are present. A server deployment group 1414 includes package1 1402, and a client deployment group 1412 includes package3 1404. The interfaces for each of the packages in the deployment group is consolidated and exposed a set of interfaces for the deployment group.

FIG. 14C illustrates an exemplary deployment map 1420 according to an embodiment of the invention. In this embodiment, the developer creates a mapping of the logical groupings to physical machines. The design surface 205 provides support for such deployment maps.

When a deployment map is opened, the user is presented with a deployment matrix 1424 of known machines 1422 and defined deployment groups 1426. The developer simply toggles the intersections to indicate if a specified group should be deployed to the indicated machine. This information is persisted in the deployment map 1420.

When the developer issues the Deploy command, the application is built by submitting the components comprising the various packages to compiler 215. The packages are constructed, and the specified deployment map 1420 is used to determine the physical targets for the built elements.

CONCLUSION

Systems and methods providing an integrated development environment wherein there is a tight coupling between a software modeling tool and the underlying code structures has been described. The systems and methods described provide advantages over prior systems. For example, as changes are made to graphical entities representing software modules, the changes can be immediately reflected in the code generated for those modules. Conversely, changes made to the source code for a module can be immediately reflected in a graphical entity representing the module.

In addition, as shown above, the various embodiments of the invention present a graphical view of a software application at a user-specified level of detail. This allows presentation from low-level details, such as inherited classes, exceptions raised, and exported/consumed interfaces, to high-level information like packaging and deployment. Higher level views display the same data at higher levels of abstraction Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, while the systems and methods have been described in the context of providing bindings for relational databases, bindings to object oriented databases can be formed as well. Moreover, the systems and methods described can be used to provide bindings to any type if computer programming language, including markup languages such as HTML.

The terminology used in this application is meant to include all of these environments. Therefore, it is manifestly intended that this invention be limited only by the following claims and equivalents thereof.

We claim:

1. A computerized system having a processor for software development comprising:
    a source code editor to edit a source code module;
    a graphical design surface to display a graphical object representing actual code of the source code module and provide integrated testing of the source code module, wherein the integrated testing includes load testing;
    a change manager to manage versioning of the source code module;
    an application datastore to store a previous version of the source code module; and
    a package manager to provide an interface for highlighting a set of software modules to be grouped together as a package and further for receiving properties to be associated with the package,
    wherein upon a change in the source code module, the change in the source code is immediately communicated to the graphical design surface and the graphical design surface is updated to reflect the change in the source code module, wherein the design surface displays the graphical object, the graphical object represents a database object, the design surface binds a particular database system to the database object, the database object further includes a database column, the source code module includes a variable, and the design surface binds the database column to the variable.

2. The computerized system of claim 1, wherein upon a change in the graphical design surface, the change in the graphical design surface is immediately communicated to the source code editor and the source code editor is updated to reflect the change in the graphical design surface.

3. The computerized system of claim 1, wherein a difference between the source code module and the previous version of the source code module is highlighted by source code editor.

4. The computerized system of claim 3, wherein the difference is highlighted using a squiggly line under the difference.

5. The computerized system of claim 3, wherein the difference is highlighted using a tooltip bar to indicate a date and an author of the difference.

6. The computerized system of claim 1, wherein a difference between the source code module and the previous version of the source code module is highlighted by the design surface.

7. The computerized system of claim 1, further comprising at least one compiler to compile the source code module into an object code format.

8. The computerized system of claim 1, wherein the design surface binds the source code module to the at least one compiler.

9. The computerized system of claim 1, wherein the binding is established through a drag-and-drop interface.

10. The computerized system of claim 1, wherein the package manager receives a list of system identifiers, each of the system identifiers identifying a particular computer system, and wherein the package manager further provides an interface to determine the particular system to deploy the package to.

11. A computerized method for developing a software project, the method comprising:
    creating a graphical object on a design surface, the graphical object representing actual code of a software module;
    binding the graphical object to an application type;
    generating source code particular to the application type;
    maintaining versioning data of the software module;
    storing a previous version of the software module;
    receiving identification of a set of software modules to be grouped together as a package; and
    receiving properties to be associated with the package, wherein the design surface displays the graphical object, the graphical object represents a database object, the design surface binds a particular database system to the database object, the database object further includes a database column, the source code module includes a variable, and the design surface binds the database column to the variable, wherein the design surface further provides support for integrated testing of the software module, further wherein the integrated testing includes load testing.

12. The computerized method of claim 11, wherein the application type is a source code compiler.

13. The computerized method of claim 11, wherein the application type is a database application.

14. The computerized method of claim 11, wherein the application type is a source code interpreter.

15. The computerized method of claim 11, further comprising:
    modifying the source code; and
    refreshing the design surface to update the graphical object to reflect the modification to the source code.

16. The computerized method of claim 11, further comprising:
    modifying the graphical object on the design surface; and
    refreshing the source code to reflect the modification to the graphical object.

17. The computerized method of claim 11, further comprising reading a template having pre-configured software modules from a datastore.

18. A computer-storage medium having computer executable instructions for performing a method for developing a software project, the method comprising:
    creating a graphical object on a design surface, the graphical object representing actual code of a software module;
    binding the graphical object to an application type in response to a user input selecting an application type;
    generating source code particular to the application type;
    maintaining versioning data of the software module;
    storing a previous version of the software module;
    in response to a user input, creating a package populated with different software components;
    receiving a user input identifying properties to be associated with the package;
    in response to a user input, creating a deployment group comprising a collection of packages for deployment;
    presenting a matrix of machines and defined deployment groups;
    receiving a user input mapping a deployment group to a set of machines; and
    storing the mapping of the deployment group to the set of machines,
    wherein the design surface displays the graphical object, the graphical object represents a database object, the design surface binds a particular database system to the database object, the database object further includes a database column, the source code module includes a variable, and the design surface binds the database column to the variable, wherein the design surface is further operative to provide integrated testing of the software module, further wherein the integrated testing includes load testing.

19. The computer-readable medium of claim 18, wherein the application type is a source code compiler.

20. The computer-readable medium of claim 18, wherein the application type is a database application.

21. The computer-readable medium of claim 18, wherein the application type is a source code interpreter.

22. The computer-readable medium of claim 18, wherein the method further comprises:
    modifying the source code; and
    refreshing the design surface to update the graphical object to reflect the modification to the source code.

23. The computer-readable medium of claim 18, wherein the method further comprises:
    modifying the graphical object on the design surface; and
    refreshing the source code to reflect the modification to the graphical object.

24. The computer-readable medium of claim 18, wherein the method further comprises reading a template having pre-configured software modules from a datastore.

* * * * *